(12) United States Patent
Skinner

(10) Patent No.: US 11,640,772 B1
(45) Date of Patent: May 2, 2023

(54) DISABLED VEHICLE ILLUMINATED SIGN

(71) Applicant: J L Skinner, Orange Park, FL (US)

(72) Inventor: J L Skinner, Orange Park, FL (US)

( * ) Notice: Subject to any disclaimer, the term of this patent is extended or adjusted under 35 U.S.C. 154(b) by 0 days.

(21) Appl. No.: 17/683,558

(22) Filed: Mar. 1, 2022

(51) Int. Cl.
| | | |
|---|---|---|
| G09F 13/04 | (2006.01) | |
| G09F 21/04 | (2006.01) | |
| F21V 17/00 | (2006.01) | |
| B60Q 7/00 | (2006.01) | |
| F21V 21/096 | (2006.01) | |
| F21L 4/08 | (2006.01) | |

(52) U.S. Cl.
CPC ........... *G09F 13/0404* (2013.01); *B60Q 7/00* (2013.01); *F21L 4/08* (2013.01); *F21V 17/007* (2013.01); *F21V 21/096* (2013.01); *G09F 13/044* (2021.05); *G09F 13/0446* (2021.05); *G09F 21/041* (2020.05); *G09F 21/042* (2020.05)

(58) Field of Classification Search
CPC .. G09F 13/0404; G09F 21/042; G09F 21/041; G09F 13/044; G09F 13/0446; G09F 13/04; G09F 7/04; G09F 7/16; G09F 7/14; G09F 13/16; B60Q 7/00; B60Q 1/2611; B60Q 1/503; B60Q 1/544; B60Q 1/2615; B60Q 1/50; F21L 4/08; F21V 17/007; F21V 21/096; F21V 29/0965; Y10S 362/812; Y10T 428/24736; G09B 1/00; G09B 1/06; F21S 43/15; F21S 4/20; F21S 4/28; F21W 2103/30
USPC ......... 40/551, 550, 552, 596, 571, 591, 592; 446/487; 362/542
See application file for complete search history.

(56) References Cited

U.S. PATENT DOCUMENTS

| | | | | |
|---|---|---|---|---|
| 1,507,195 A | * | 9/1924 | Moore | G09F 13/00 428/3 |
| 1,541,004 A | * | 6/1925 | Gracebel | G09B 17/00 446/120 |
| 3,622,980 A | * | 11/1971 | Elledge, Jr. | G08G 1/096783 340/908 |
| 9,395,217 B1 | * | 7/2016 | Gaor | G09F 17/00 |
| 2017/0088047 A1 | * | 3/2017 | Parvaresh | B60Q 1/2615 |
| 2021/0063001 A1 | * | 3/2021 | Hartenstein | B60Q 1/2615 |
| 2021/0178964 A1 | * | 6/2021 | Kilim | B60Q 1/268 |

FOREIGN PATENT DOCUMENTS

KR 20200044449 A * 4/2020

* cited by examiner

*Primary Examiner* — Jonathan Liu
*Assistant Examiner* — Rachel Mae Griffith
(74) *Attorney, Agent, or Firm* — Sanchelima & Associates, P.A.; Christian Sanchelima; Jesus Sanchelima

(57) ABSTRACT

A disabled vehicle illumination sign including a sign assembly, an electronic assembly and an attaching assembly is disclosed herein. The sign assembly includes a plurality of members being hingedly connected one to each other. The plurality of members form multiple signs of a letter to alert of a disabled vehicle. Each of the multiple signs can be used separately or in conjunction to alert that a vehicle is having engine problems, or medical problems or tire problems. The sign assembly is foldable. The electronic assembly includes a plurality of lights being disposed on a front portion of each member of the plurality of members. The attaching assembly includes an attaching member located on a bottom portion of the sign assembly. The attaching member allows the sign assembly to be removably attached to the disabled vehicle.

1 Claim, 3 Drawing Sheets

DISABLED VEHICLE ILLUMINATED SIGN

BACKGROUND OF THE INVENTION

Description of the Related Art

Several designs for disabled vehicle illumination sign have been designed in the past. None of them, however, include capital western alphabetical letters having a plurality of lights disposed on each of the letters.

Applicant believes that a related reference corresponds to U.S. Pat. No. 6,195,000 issued for an emergency auto visual communication system that will enhance roadway, vehicular, and individual safety. Applicant believes that another related reference corresponds to U.S. Pat. No. 5,815,969 issued for a sign for indicating that assistance is required. None of these references, however, teach of a disabled vehicle illumination sign comprising capital western alphabet letters having a plurality of lights and hinges for folding the letters for easy storage.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a disabled vehicle illumination sign that warns passing vehicles of specific issues of a disabled vehicle such as medical, tire or engine issues.

It is another object of this invention to provide a disabled vehicle illumination sign that includes a base having a magnet to removably attach the letters to a vehicle.

It is still another object of the present invention to provide a vehicle illumination sign that includes letters having hinges for storing said letters.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
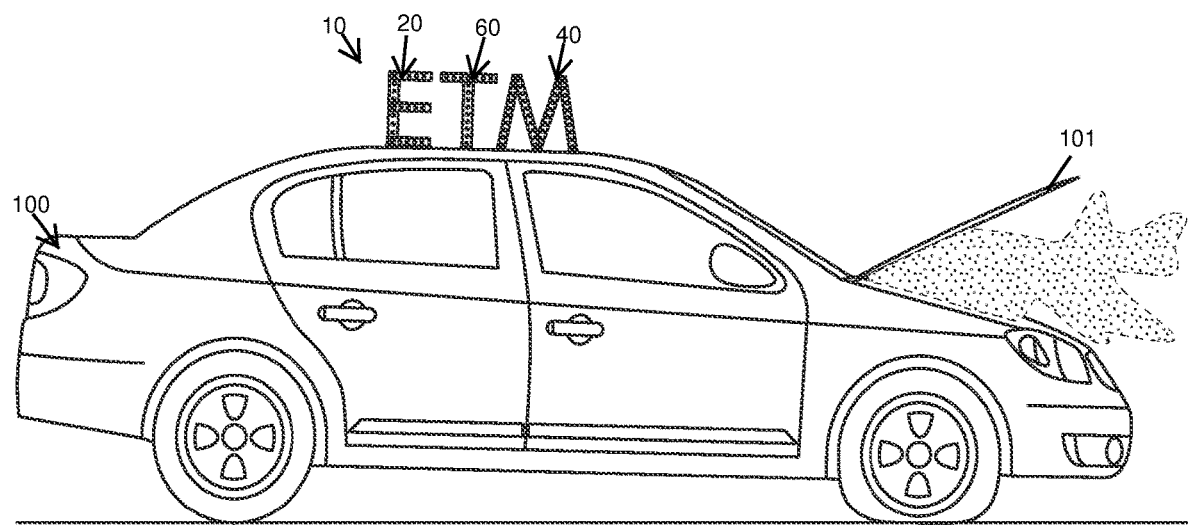
FIG. 1 represents an isometric operational view of the present invention 10 showing a disabled vehicle 101 having an engine sign assembly 20, a medical sign assembly 40 and a tire sign assembly 60 being mounted to a roof of the disabled vehicle 101.

Referring now to the drawings, where the present invention is generally referred to with numeral 10, it can be observed that it basically includes an engine sign assembly 20, a medical sign assembly 40, a tire sign assembly 60, an electronic assembly 80, an attaching assembly 90 and a vehicle assembly 100. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The vehicle assembly 100 may include a disabled vehicle 101. The disabled vehicle may have an engine problem, a tire problem or a passenger requiring medical assistance. The attaching assembly 90 may include a plurality of hinges 91. Each hinge of the plurality of hinges 91 may be a ball bearing hinge, a barrel hinge, a concealed hinge, a strap hinge or any other type of hinge known in the prior art. The electronic assembly 80 may include a plurality of lights 82. The plurality of lights 82 may be LED lights, halogen lights, neon lights, fluorescent lights, or any other type of light known in the prior art. The plurality of lights may be steady lights or blinking lights. The plurality of lights 82 may be powered by a battery 84. In one embodiment, the battery 84 may be a rechargeable battery of 12V. Other embodiments for the battery may include rechargeable or non rechargeable batteries of any voltage. The battery 84 may be recharged via an electric cord 86 that may be plugged to the vehicle.

Figure 2:
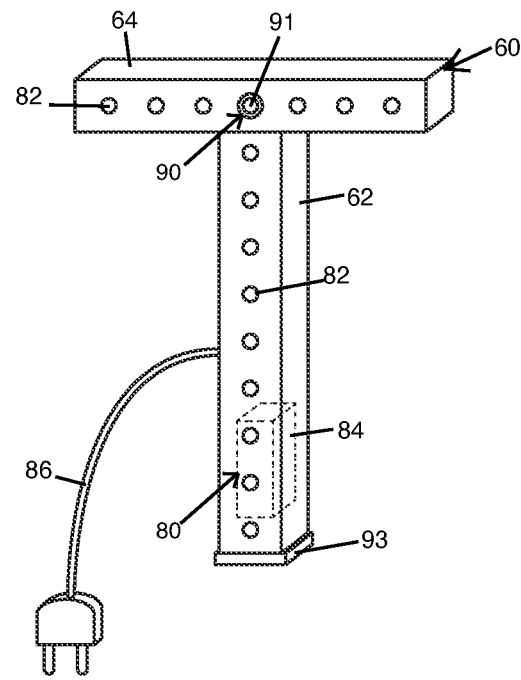
FIG. 2 shows an isometric view of the tire sign assembly 60 showing the tire sign assembly 60 having the plurality of lights 82.

Referring now to FIG. 2, the tire sign assembly 60 may include a first tire sign 62 and a second tire sign 64. The first tire sign 62 may have an elongated rectangular shape. It also may be suitable to have a first tire sign 62 having any other elongated shape. The first tire sign 62 may be made of a transparent or opaque material. The first tire sign 62 may be made of a plastic, wood, a metal, or the like. An entire length of a front side of the first tire sign 62 may have the plurality of lights 82 disposed thereon. The plurality of lights 82 may be located inside the first tire sign 62 with the first tire sign being transparent. It also may be suitable to have the plurality of lights 82 being located outside the first tire sign 62 with the first tire sign 62 being opaque. The second tire sign 64 may have an elongated rectangular shape. The second tire sign 62 may have a length smaller than a length of the first tire sign 62. It also may be suitable to have a second tire sign 64 having any other elongated shape. The second tire sign 64 may be made of a transparent or opaque material. The second tire sign 64 may be made of a plastic, wood, a metal, or the like. An entire length of a front side of the second tire sign 64 may have the plurality of lights 82 disposed thereon. The plurality of lights 82 may be located inside the second tire sign 64 with the second tire sign 64 being transparent. It also may be suitable to have the plurality of lights 82 being located outside the second tire sign 64 with the second tire sign 64 being opaque. A middle portion of the second tire sign 64 may be perpendicularly and hingedly attached to the first tire sign 62 via one hinge of the plurality of hinges 91. The second tire sign 64 may be folded to be parallel to the first tire sign for easy storing. A bottom side of the first tire sign 62 may have a first magnet 93 attached thereon. The first magnet 93 may have substantially same length and same width as the bottom side of the first tire sign 62. The first magnet 93 may be a soft magnet. The tire assembly 60 may include the battery 84 to power the plurality of lights 82. The battery 84 may be located inside the first tire sign 62. It also may be suitable to locate the battery in the second tire sign 64. The electric cord 86 may be located on the first tire sign 62.

Figure 3:
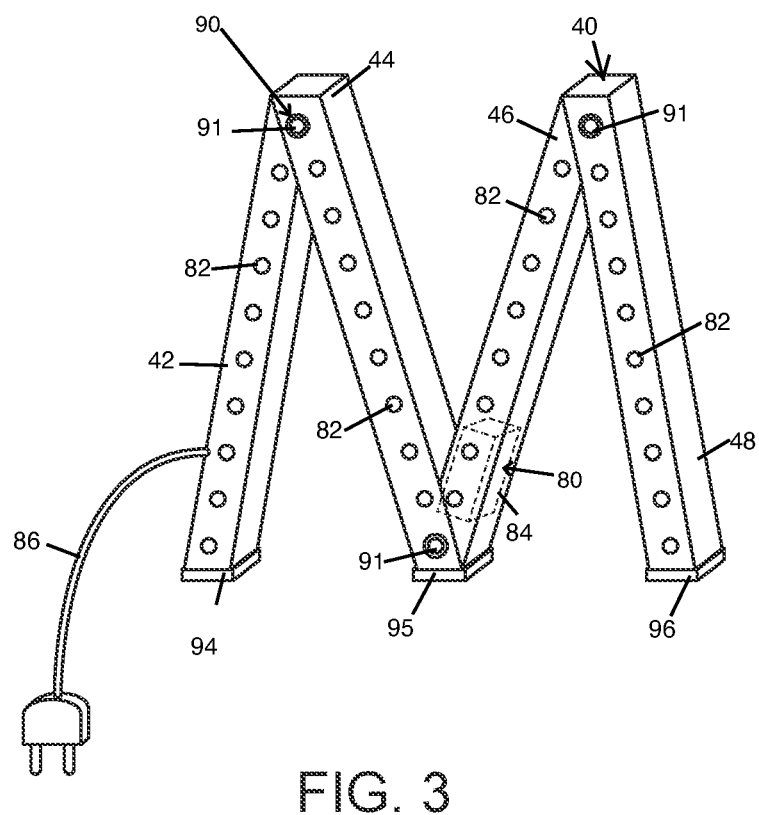
FIG. 3 illustrates an isometric view of the medical sign assembly 40 showing the medical sign assembly 40 having the plurality of lights 82.

Referring now to FIG. 3, the medical sign assembly 40 may include a first medical sign 42, a second medical sign 44, a third medical sign 46 and a fourth medical sign 48. The first medical sign 42 may have an elongated shape. The first medical sign 42 may be made of a transparent or opaque material. The first medical sign 42 may be made of a plastic, wood, a metal, or the like. An entire length of a front side of the first medical sign 42 may have the plurality of lights 82 disposed thereon. The plurality of lights 82 may be located inside the first medical sign 42 with the first medical sign 42 being transparent. It also may be suitable to have the plurality of lights 82 being located outside the first medical sign 42 with the first medical sign 42 being opaque. A bottom side of the first medical sign 42 may have a second magnet 94 attached thereon. The second magnet 94 may be a soft magnet. The second magnet 94 may have substantially same length and same width as the bottom side of the first medical sign 42.

The second medical sign 44 may have an elongated shape. The second medical sign 44 may be made of a transparent or opaque material. The second medical sign 44 may be made of a plastic, wood, a metal, or the like. An entire length of a front side of the second medical sign 44 may have the plurality of lights 82 disposed thereon. The plurality of lights 82 may be located inside the second medical sign 44 with the second medical sign 44 being transparent. It also may be suitable to have the plurality of lights 82 being located outside the second medical sign 44 with the second medical sign 44 being opaque. A bottom side of the second medical sign 44 may have a third magnet 95 attached thereon. The third magnet 95 may be a soft magnet. The third magnet 95 may have substantially same length and same width as the bottom side of the second medical sign 44.

The third medical sign 46 may have an elongated shape. The third medical sign 46 may be made of a transparent or opaque material. The third medical sign 46 may be made of a plastic, wood, a metal, or the like. An entire length of a front side of the third medical sign 46 may have the plurality of lights 82 disposed thereon. The plurality of lights 82 may be located inside the third medical sign 46 with the third medical sign 46 being transparent. It also may be suitable to have the plurality of lights 82 being located outside the third medical sign 46 with the third medical sign 46 being opaque.

The fourth medical sign 48 may have an elongated shape. The fourth medical sign 48 may be made of a transparent or opaque material. The fourth medical sign 48 may be made of a plastic, wood, a metal, or the like. An entire length of a front side of the fourth medical sign 48 may have the plurality of lights 82 disposed thereon. The plurality of lights 82 may be located inside the fourth medical sign 48 with the fourth medical sign 48 being transparent. It also may be suitable to have the plurality of lights 82 being located outside the fourth medical sign 48 with the fourth medical sign 48 being opaque. A bottom side of the fourth medical sign 48 may have a fourth magnet 96 attached thereon. The fourth magnet 96 may be a soft magnet. The fourth magnet 96 may have substantially same length and same width as the bottom side of the fourth medical sign 48.

A distal top end of the first medical sign 42 may be hingedly attached to a distal top end of the second medical sign 44 via one hinge of the plurality of hinges 91. A distal bottom end of the second medical sign 44 may be hingedly attached to a distal bottom end of the third medical sign 46 via one hinge of the plurality of hinges 91. A distal top end of the third medical sign 46 nay be hingedly attached to a distal top end of the fourth medical sign 48 via one hinge of the plurality of hinges 91. As shown in FIG. 3, the first medical sign 42 and the second medical sign 44 may be configured to have an acute angle. The second medical sign 44 and the third medical sign 46 may be configured to have an acute angle. The third medical sign 46 and the fourth medical sign 48 may be configured to have an acute angle. The first medical sign 42 and the third medical sign 46 may be configured to be parallel. The second medical sign 44 and the fourth medical sign 48 may be configured to be parallel. The medical sign assembly 40 may be configured to form a letter M sign. The medical sign assembly 40 may be folded for easy storing and transport.

The medical sign assembly 40 may include the battery 84 to power the plurality of lights 82. In one embodiment, the battery 84 may be located inside the third medical sign 46. It also may be suitable to locate the battery 84 anywhere on the medical assembly 60. The electric cord 86 may provide electrical power to the battery 84. The electric cord 86 may be located on the first medical sign 42.

Figure 4:
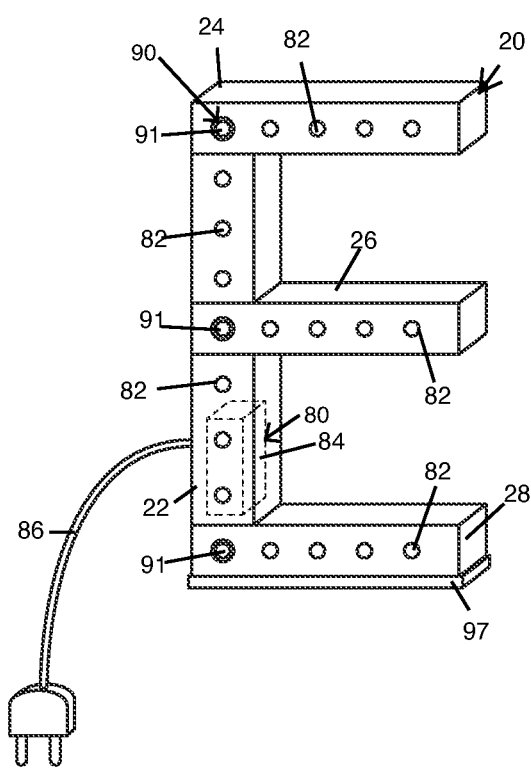
FIG. 4 is an isometric view of the engine sign assembly 20 showing the engine sign assembly 20 having the plurality of lights 82.

Referring now to FIG. 4, the engine sign assembly 20 may include a first engine sign 22, a second engine sign 24, a third engine sign 26 and a fourth medical sign 28. The first engine sign 22 may have an elongated shape. The first engine sign 22 may be made of a transparent or opaque material. The first engine sign 22 may be made of a plastic, wood, a metal, or the like. An entire length of a front side of the second engine sign 22 may have the plurality of lights 82 disposed thereon. The plurality of lights 82 may be located inside the first engine sign 22 with the first engine sign 22 being transparent. It also may be suitable to have the plurality of lights 82 being located outside the first engine sign 22 with the first engine sign 22 being opaque.

The second engine sign 24 may have an elongated shape. The second engine sign 24 may be made of a transparent or opaque material. The second engine sign 24 may be made of a plastic, wood, a metal, or the like. An entire length of a front side of the second engine sign 24 may have the plurality of lights 82 disposed thereon. The plurality of lights 82 may be located inside the second engine sign 22 with the second engine sign 24 being transparent. It also may be suitable to have the plurality of lights 82 being located outside the second engine sign 24 with the second engine sign 24 being opaque.

The third engine sign 26 may have an elongated shape. The third engine sign 26 may be made of a transparent or opaque material. The third engine sign 26 may be made of a plastic, wood, a metal, or the like. An entire length of a front side of the third engine sign 26 may have the plurality of lights 82 disposed thereon. The plurality of lights 82 may be located inside the third engine sign 26 with the third engine sign 26 being transparent. It also may be suitable to have the plurality of lights 82 being located outside the third engine sign 26 with the third engine sign 26 being opaque.

The fourth engine sign 28 may have an elongated shape. The fourth engine sign 28 may be made of a transparent or opaque material. The fourth engine sign 28 may be made of a plastic, wood, a metal, or the like. An entire length of a front side of the fourth engine sign 28 may have the plurality of lights 82 disposed thereon. The plurality of lights 82 may be located inside the fourth engine sign 28 with the fourth engine sign 28 being transparent. It also may be suitable to have the plurality of lights 82 being located outside the fourth engine sign 28 with the fourth engine sign 28 being opaque. A bottom side of the fourth engine sign 28 may have a fifth magnet 97 attached thereon. The fifth magnet 97 may be a soft magnet. The fifth magnet 97 may have substantially same length and same width as the bottom side of the fourth engine sign 28.

A distal bottom end of the first engine sign 22 may be hingedly attached to a distal left end of the fourth engine sign 28 via one hinge of the plurality of hinges 91. A distal left end of the third engine sign 26 may be hingedly attached to a middle portion of the first engine sign 22 via one hinge of the plurality of hinges 91. A distal left end of the second engine sign 24 may be hingedly attached to a distal top end of the first engine sign 22 via one hinge of the plurality of hinges 91. As shown in FIG. 4, the fourth engine sign 28 may be configured to be perpendicular to the first engine sign 22. The second engine sign 24 and the third engine sign 26 may be parallel to the fourth engine sign 28. The engine sign assembly 20 may be configured to be folded for easy storing.

The engine assembly 20 may include the battery 84 to power the plurality of lights 82. The battery 84 may be located inside the first engine sign 22. It also may be suitable to locate the battery 84 in other portion of the engine assembly 20. The electric cord 86 may be located on the first engine sign 82.

Referring no to FIG. 1, the present invention 10 may be magnetically attached to a roof of a disabled vehicle 101 to alert other vehicles that the disabled vehicle 101 is having engine problems, or medical problems, or tire problems. The medical sign assembly 40 may have de plurality of lights 82 having a red color to indicate that medical assistance is required. The engine sign assembly 80 may have the plurality of lights 82 having an amber color to indicate that the disabled vehicle 101 is having engine issues. The tire sign assembly 20 may have the plurality of lights 82 having an amber color to indicate that the disabled vehicle 101 is having tire issues. It should be understood, that the color of the plurality of lights 82 may be any other color. It should be understood that the present invention 10 may include any other assembly having a plurality of sign members to define a letter sign assembly of any disabled issue car. It should be understood that the medical sign assembly 40, the engine sign assembly 20 or the tire sign assembly 60 may be magnetically placed on the roof of disabled vehicle 101 separately or in conjunction depending on what issue the vehicle has. It may be suitable to only use the engine sign assembly 20 when the car has engine troubles. It may be suitable to only use the tire sign assembly 60 when the car has tire issues. It may be suitable to only use the medical sign assembly 40 when the user has a medical problem.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A disabled vehicle illumination sign, consisting of:
a) an engine sign assembly including a first engine sign member, a second engine sign member, a third engine sign member and a fourth engine sign member, said first engine sign member having a rectangular shape, said second engine sign member having a rectangular shape, said third engine sign member having a rectangular shape, said fourth engine sign member having a rectangular shape, wherein a top end of the first engine sign member is hingedly connected to a left end of the second engine sign member, a left end of the third engine sign member is hingedly connected to a middle portion of the first engine sign member, a left end of the fourth engine sign member is hingedly connected to a bottom end of the first engine sign member;
b) a medical sign assembly including a first medical sign member, a second medical sign member, a third medical sign member and a fourth medical sign member, wherein a top end of the second medical sign member is hingedly attached to a top end of the first medical sign member, a bottom end of the third medical sign member is hingedly attached to a bottom end of the second medical sign member, a top end of the third medical sign member is hingedly attached to a top end of the fourth medical sign member, said medical sign assembly is capable of being foldable for storing;
c) a tire sign assembly including a first tire sign member and a second tire sign member, wherein a middle portion of the second tire sign member is perpendicularly and hingedly connected to a top end of the first tire sign member, said tire sign assembly being capable of being foldable for storing;
d) an electronic assembly including a plurality of lights being disposed on a front portion of the engine sign assembly and in a front portion of the medical sign assembly and in a front portion of the tire sign assembly, the plurality of lights of the front portion of the medical sign assembly being red lights, the plurality of lights of the front portion of the engine sign assembly being amber lights, the plurality of lights of the front portion of the tire sign assembly being amber lights; and
e) an attaching assembly including a plurality of magnets, the plurality of magnets located on a bottom portion of the medical sign assembly to allow the medical sign assembly to be removably attached to a roof of a disabled vehicle, said plurality of magnets also attached to a bottom portion of the tire sign assembly to allow the tire assembly to be removably attached to the roof of the disabled vehicle, said plurality of magnets also located on a bottom portion of the engine sign assembly to allow the engine assembly to be removably attached to the roof of the disabled vehicle.

* * * * *